(12) United States Patent
Hisada et al.

(10) Patent No.: US 8,211,522 B2
(45) Date of Patent: Jul. 3, 2012

(54) MANUFACTURING METHOD FOR OPTICAL INFORMATION RECORDING MEDIUM AND OPTICAL INFORMATION RECORDING MEDIUM

(75) Inventors: Kazuya Hisada, Osaka (JP); Yuuko Tomekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/598,816

(22) PCT Filed: Mar. 5, 2009

(86) PCT No.: PCT/JP2009/000992
§ 371 (c)(1),
(2), (4) Date: Nov. 4, 2009

(87) PCT Pub. No.: WO2009/113278
PCT Pub. Date: Sep. 17, 2009

(65) Prior Publication Data
US 2010/0157784 A1 Jun. 24, 2010

(30) Foreign Application Priority Data
Mar. 10, 2008 (JP) ................................. 2008-058925

(51) Int. Cl.
*B32B 3/02* (2006.01)
(52) U.S. Cl. .................. 428/64.1; 428/64.4; 430/270.11
(58) Field of Classification Search ................. 428/64.4; 430/270.11
See application file for complete search history.

(56) References Cited

U.S. PATENT DOCUMENTS

| | | |
|---|---|---|
| 2002/0031632 A1 | 3/2002 | Hisada et al. |
| 2004/0190433 A1 | 9/2004 | Hisada et al. |
| 2005/0093185 A1 | 5/2005 | Komaki |
| 2007/0121480 A1* | 5/2007 | Mishima et al. ............. 369/283 |
| 2007/0297315 A1 | 12/2007 | Aga et al. |

FOREIGN PATENT DOCUMENTS

| | | |
|---|---|---|
| JP | 5-6546 | 1/1993 |
| JP | 10-255323 | 9/1998 |
| JP | 11-286168 | 10/1999 |
| JP | 3763763 | 9/2002 |

(Continued)

OTHER PUBLICATIONS

International Search Report issued Jun. 2, 2009 in International (PCT) Application No. PCT/JP2009/000992.

(Continued)

*Primary Examiner* — Elizabeth Mulvaney
(74) *Attorney, Agent, or Firm* — Wenderoth, Lind & Ponack, L.L.P.

(57) ABSTRACT

Optical recording medium manufacturing includes: providing a first resin on a first recording layer; forming a first intermediate layer by performing first UV irradiation at a first dose to cure the first resin; providing a second recording layer on the first intermediate layer; providing a second resin on the second recording layer; forming a second intermediate layer by performing second UV irradiation at a second dose to cure the second resin; providing a third recording layer on the second intermediate layer; providing a third resin on the third recording layer; and forming a light transmitting layer by performing third UV irradiation at a third dose to cure the third resin. The first and second resins have substantially the same relationships between UV dose received and linear expansion coefficient. The first through third doses are such that UV doses received by the intermediate layers are substantially the same.

11 Claims, 5 Drawing Sheets

FOREIGN PATENT DOCUMENTS

| | | |
|---|---|---|
| JP | 2003-85836 | 3/2003 |
| JP | 2005-141816 | 6/2005 |
| JP | 2005-280261 | 10/2005 |
| JP | 2005-332564 | 12/2005 |
| JP | 2006-85845 | 3/2006 |
| JP | 2006-335861 | 12/2006 |
| JP | 2007-26479 | 2/2007 |
| WO | 2004-061836 | 7/2004 |

OTHER PUBLICATIONS

International Preliminary Report on Patentability and Written Opinion of the International Searching Authority (in English), issued Oct. 12, 2010 in International (PCT) Application No. PCT/JP2009/000992.

* cited by examiner

MANUFACTURING METHOD FOR OPTICAL INFORMATION RECORDING MEDIUM AND OPTICAL INFORMATION RECORDING MEDIUM

BACKGROUND OF THE INVENTION

1. Technical Field

The present invention relates to a manufacturing method for an optical information recording medium and an optical information recording medium. More particularly, the present invention relates to, for example, a manufacturing method for a multilayer optical information recording medium having a plurality of information recording layers and a plurality of intermediate layers and a multilayer optical information recording medium.

2. Background Art

In recent years, in the field of information recording, various researches on optical information recording have been conducted. Optical information recording makes it possible to achieve higher-density recording and non-contact recording/reproduction at low costs, and therefore has been applied to a wide range of applications. Currently, various optical discs such as CDs, DVDs, and Blu-ray discs are widely used.

Blu-ray discs currently used have two information recording layers and can store up to 50 GB of information. Blu-ray disc media types are categorized into read-only type, write-once type, and rewritable type. In order to achieve larger-capacity recording and higher-density, research on multilayer Blu-ray discs having three or more information recording layers is currently underway, and some multilayer Blu-ray discs have already been proposed, as shown in Japanese Patent No. 3763763 and Japanese Patent Laid-open Publication No. 2005-141816.

Such a multilayer Blu-ray disc is basically constituted from a substrate having a thickness of about 1.1 mm, a plurality of intermediate layers, a plurality of information recording layers separated from each other by the intermediate layers, and a light transmitting layer allowing light for recording/reproducing information to pass through and protecting the information recording layer. The substrate is often made of polycarbonate, and the intermediate layers and the light transmitting layer are often made of a UV curable resin.

SUMMARY OF THE INVENTION

However, such a multilayer optical information recording medium has a laminated structure with alternating intermediate layers and information recording layers, and therefore it is problematic that the information recording layers are likely to be damaged by thermal deformation of the intermediate layers due to changes in usage environment or by deformation of the intermediate layers due to water absorption. Further, it has been found that an information recording layer sandwiched between two intermediate layers is particularly likely to be damaged.

The present inventors have analyzed this phenomenon, and as a result, have found that the two intermediate layers have different coefficients of linear expansion, and therefore when thermal expansion or contraction occurs in each of the intermediate layers, distortion is likely to occur in the interface between the two intermediate layers, thereby causing damage to the information recording layer present at the interface between the two intermediate layers.

Further, the present inventors have also found that even when two intermediate layers sandwiching an information recording layer are made of exactly the same UV curable resin, damage to the information recording layer can occur. This results from the fact that the two intermediate layers are not formed at the same time, because a lower intermediate layer is first formed by applying a UV curable resin and curing the resin by UV irradiation, and then, after the completion of formation of an information recording layer on the lower intermediate layer, an upper intermediate layer is formed by applying a UV curable resin and curing the resin by UV irradiation. Therefore, when the upper intermediate layer is formed, the lower intermediate layer is also irradiated with UV light. This causes a large difference in coefficient of linear expansion between the two intermediate layers depending on the dose of UV light applied or the type of UV light source used, and therefore, as in the case of using different UV curable resins, the phenomenon described above can occur by the same mechanism as described above.

It is therefore an object of the present invention to provide a manufacturing method for a multilayer optical information recording medium having a plurality of information recording layers and at least two intermediate layers sandwiching one of the information recording layers therebetween.

The present invention is directed to a manufacturing method for an optical information recording medium having three information recording layers, two intermediate layers, and one light transmitting layer, the method includes:

providing a first UV curable resin on a first information recording layer;

forming a first intermediate layer by curing the first UV curable resin by performing first-time UV irradiation to irradiate the first UV curable resin with UV light emitted from above the first UV curable resin at a first dose;

providing a second information recording layer on the first intermediate layer;

providing a second UV curable resin on the second information recording layer;

forming a second intermediate layer by curing the second UV curable resin by performing second-time UV irradiation to irradiate the second UV curable resin with UV light emitted from above the second UV curable resin at a second dose;

providing a third information recording layer on the second intermediate layer;

providing a third UV curable resin on the third information recording layer; and forming a light transmitting layer by curing the third UV curable resin by performing third-time UV irradiation to irradiate the third UV curable resin with UV light emitted from above the third UV curable resin at a third dose, wherein the first UV curable resin and the second UV curable resin have substantially the same characteristics in terms of the relationship between total UV dose received and coefficient of linear expansion, and wherein the first dose during the first-time UV irradiation, the second dose during the second-time UV irradiation, and the third dose during the third-time UV irradiation are controlled so that a total UV dose received by the first intermediate layer and a total UV dose received by the second intermediate layer become substantially the same.

The manufacturing method for an optical information recording medium of the present invention makes it possible to produce a highly-reliable optical information recording medium with less stress of the optical information recording medium due to the difference of the thermal elongation of the intermediate layers.

When a transmittance of the second information recording layer is defined as $t_2$, a transmittance of the third information recording layer is defined as $t_3$, the first dose during the first-time UV irradiation is defined as $UV_1$, the second dose during the second-time UV irradiation is defined as $UV_2$, the third dose during the third-time UV irradiation is defined as $UV_3$, the total UV dose received by the first intermediate layer is defined as $P_1$, and the total UV dose received by the second intermediate layer is defined as $P_2$, the total UV dose $P_1$ is represented by the following formula:

$$P_1 = UV_1 + UV_2 \cdot t_2 + UV_3 \cdot t_2 \cdot t_3,$$

and the total UV dose $P_2$ is represented by the following formula:

$$P_2 = UV_2 + UV_3 \cdot t_3.$$

In this case, the first dose $UV_1$ during the first-time UV irradiation, the second dose $UV_2$ during the second-time UV irradiation, and the third dose $UV_3$ during the third-time UV irradiation are controlled so that the total UV dose $P_1$ received by the first intermediate layer and the total UV dose $P_2$ received by the second intermediate layer become substantially the same.

Further, the first UV curable resin and the second UV curable resin may be the same. This makes it possible to allow the first and second intermediate layers made of the same material to have approximately the same coefficient of linear expansion, thereby making it possible to produce a highly-reliable optical information recording medium with no risk of thermal stress cracking in the information recording medium sandwiched between the two intermediate layers.

In the step of forming the first intermediate layer, the first UV curable resin and a first stamper having a groove or pits for the second information recording layer may be opposed to and brought into close contact with each other and then the first UV curable resin may be irradiated with UV light emitted from above the first UV curable resin and passed through the first stamper to cure the first UV curable resin to form the first intermediate layer.

Further, in the step of forming the second intermediate layer, the second UV curable resin and a second stamper having a groove or pits for the third information recording layer may be opposed to and brought into close contact with each other and then the second UV curable resin may be irradiated with UV light emitted from above the second UV curable resin and passed through the second stamper to cure the second UV curable resin to form the second intermediate layer.

The manufacturing method for an optical information recording medium is a manufacturing method for an optical information recording medium having n information recording layers (n is a natural number of 3 or more), n−1 intermediate layers, and one light transmitting layer, the method includes:

(1) repeating the following steps a) to c) until a natural number i changes from 1 to n−1:
a) providing an i-th UV curable resin on an i-th information recording layer;
b) forming an i-th intermediate layer by curing the i-th UV curable resin by performing i-th UV irradiation to irradiate the i-th UV curable resin with UV light emitted from above the i-th UV curable resin at an i-th dose $UV_i$; and
c) providing an (i+1)-th information recording layer on the i-th intermediate layer;

(2) providing an n-th UV curable resin on the (n−1)th information recording layer; and (3) forming a light transmitting layer by curing the n-th UV curable resin by performing n-th UV irradiation to irradiate the n-th UV curable resin with UV light emitted from above the n-th UV curable resin at an n-th dose $UV_n$, wherein the i-th UV curable resins (i is a natural number varying from 1 to n−1) have substantially the same characteristics in terms of the relationship between total UV dose received and coefficient of linear expansion and total UV doses $P_s$ received by each of s-th intermediate layers represented by the following formula are substantially the same:

$$P_S = UV_S + \sum_{i=S+1}^{n} UV_i \left( \prod_{j=S+1}^{i} t_j \right)$$

wherein n is a natural number of 3 or more, s is a natural number varying from 1 to n−1, i and j are each a natural number of 2 or more, and $t_i$ represents a transmittance of the i-th information recording layer.

In the step of forming the i-th intermediate layer, the i-th UV curable resin and an i-th stamper having a groove or pits for the (i+1)-th information recording layer may be opposed to and brought into close contact with each other and then the i-th UV curable resin may be irradiated with UV light emitted from above the i-th UV curable resin and passed through the i-th stamper to cure the i-th UV curable resin to form the i-th intermediate layer.

The manufacturing method for an optical information recording medium of the present invention is a manufacturing method for an optical information recording medium having three information recording layers, two intermediate layers, and one light transmitting layer, the method includes:

providing a first UV curable resin on a first information recording layer;

forming a first intermediate layer by curing the first UV curable resin by performing first-time UV irradiation to irradiate the first UV curable resin with UV light emitted from above the first UV curable resin at a first dose;

providing a second information recording layer on the first intermediate layer;

providing a second UV curable resin on the second information recording layer;

forming a second intermediate layer by curing the second UV curable resin by performing second-time UV irradiation to irradiate the second UV curable resin with UV light emitted from above the second UV curable resin at a second dose;

providing a third information recording layer on the second intermediate layer;

providing a third UV curable resin on the third information recording layer; and forming a light transmitting layer by curing the third UV curable resin by performing third-time UV irradiation to irradiate the third UV curable resin with UV light emitted from above the third UV curable resin at a third dose, wherein the first UV curable resin and the second UV curable resin are different from each other, and wherein the first dose during the first-time UV irradiation, the second dose during the second-time UV irradiation, and the third dose during the third-time UV irradiation are controlled so that a difference in coefficient of linear expansion between the first intermediate layer subjected to the first-time, second-time, and third-time UV irradiation and the second intermediate layer subjected to the second-time and third-time UV irradiation becomes less than $2.5 \times 10^{-4}$ (1/° C.).

In the step of forming the first intermediate layer, the first UV curable resin and a first stamper having a groove or pits for the second information recording layer may be opposed to and brought into close contact with each other and then the first UV curable resin may be irradiated with UV light emitted from above the first UV curable resin and passed through the first stamper to cure the first UV curable resin to form the first intermediate layer.

Further, in the step of forming the second intermediate layer, the second UV curable resin and a second stamper having a groove or pits for the third information recording layer may be opposed to and brought into contact with each other and then the second UV curable resin may be irradiated with UV light emitted from above the second UV curable resin and passed through the second stamper to cure the second UV curable resin to form the second intermediate layer.

The optical information recording medium of the present invention is an optical information recording medium with three or more information recording layers produced by the manufacturing method for an optical information recording medium, the optical information recording medium includes:

two intermediate layers between which one of the three or more information recording layers is sandwiched, wherein a difference in coefficient of linear expansion between the two adjacent intermediate layers sandwiching the one of the information recording layers is less than $2.5 \times 10^{-4}$ ($1/^\circ$ C.).

Further, the difference in coefficient of linear expansion between the two adjacent intermediate layers sandwiching the one of the information recording layers may be $1.9 \times 10^{-4}$ ($1/^\circ$ C.) or less. This makes it possible to obtain an optical information recording medium having higher thermal reliability.

Further, each of the two adjacent intermediate layers sandwiching the one of the information recording layers may have a tensile elastic modulus of 100 MPa or more at a temperature of 60° C. or less. This makes it possible for the resin layers to stably maintain the shape of a groove or pits, thereby making it possible to maintain the reliability of the optical information recording medium.

According to the present invention, it is possible to provide an optical information recording medium with no risk of damage to an information recording layer sandwiched between two intermediate layers made of a UV curable resin due to thermal deformation of the intermediate layers and a manufacturing method for such an optical information recording medium.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Herein below, some embodiments of the present invention will be described with reference to the accompanying drawings. It is to be noted that the drawings are sectional views unless otherwise specified, and when the cross section in each of the drawings is symmetric, there is a case where only one-half of the cross section on one side of the axis of symmetry is shown and the other half is omitted. Further, in the drawings, substantially the same members are denoted by the same reference numeral.

First Embodiment

Herein below, a first embodiment of the present invention will be described with reference to FIG. 1.

Figure 1:
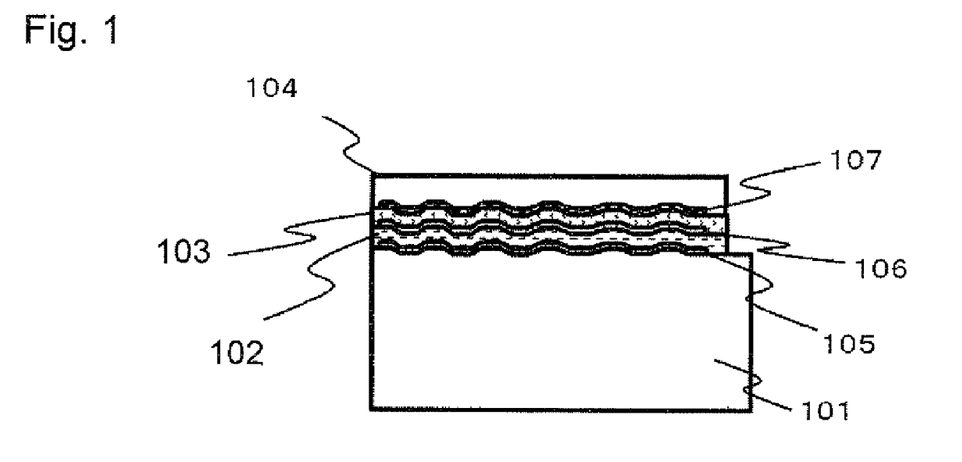
FIG. 1 is a sectional view showing one example of an optical information recording medium according to a first embodiment of the present invention.

FIG. 1 is a drawing showing one example of an optical information recording medium according to the present invention. This optical information recording medium is a so-called three-layer optical information recording medium having three information recording layers 105, 106, and 107. The optical information recording medium further has a substrate 101, two intermediate layers 102 and 103 for separating the information recording layers from each other, and a light transmitting layer 104 protecting the third information recording layer 107 and allowing light for recording/reproducing information to pass through. The substrate 101 is a disk-shaped substrate having a thickness of about 1.1 mm and a diameter of about 120 mm. The disk-shaped substrate 101 has a center hole with a diameter of 15 mm. The first intermediate layer 102 has a thickness of about 25 µm (±2 µm), and the second intermediate layer 103 has a thickness of about 18 µm (±2 µm). It is to be noted that the thickness of each of the intermediate layers 102 and 103 is preferably 30 µm or less. The light transmitting layer 104 preferably has a thickness of 70 µm or less. The optical information recording medium may further have a protective layer for protecting the surface of the light transmitting layer 104.

According to the optical information recording medium of the first embodiment of the present invention, the difference in coefficient of linear expansion between the first intermediate layer 102 and the second intermediate layer 103 is less than $2.5 \times 10^{-4}$ ($1/^\circ$ C.).

Further, according to a method for producing an optical information recording medium of the first embodiment of the present invention, the first intermediate layer 102 and the second intermediate layer 103 are made of different UV curable resins, respectively, and that three-times UV irradiation are controlled in consideration of the transmittance of the second information recording layer 106 and the transmittance of the third information recording layer 107 so that the difference in coefficient of linear expansion between the first intermediate layer 102 and the second intermediate layer 103 becomes less than $2.5 \times 10^{-4}$ (1/° C.).

According to the first embodiment of the present invention, the substrate 101 is formed by injection molding using polycarbonate as a material, and the first intermediate layer 102, the second intermediate layer 103, and the light transmitting layer 104 are basically made of different acrylic UV curable resins. Examples of such a UV curable resin include those containing two or more of
(A) urethane (meth)acrylate and/or epoxy (meth)acrylate,
(B) (meth)acrylate monomer,
(C) photopolymerization initiator, and
(D) additive. Each of the substrate 101 and the intermediate layers 102 and 103 has a groove or pits necessary for recording/reproducing information. Rewritable- and write once-type optical information recording media were produced, respectively.

These three-layer optical information recording media were subjected to a thermal cycle test to examine their reliability in practical use. The thermal cycle test is usually performed by repeated cyclic heating and cooling between a high temperature of about 60° C. and room temperature (25° C.) on the assumption that an optical information recording medium of interest is inserted into and ejected from a recorder or player placed in a rack or car audio-visual equipment in summer to record or reproduce information. In such a situation, there is a case where the temperature of inside of such equipment increases to about 60° C. Therefore, the two types of optical information recording media were subjected to a thermal cycle test by repeating a cycle of heating at 60° C. for 1 hour and cooling at 25° C. for 1 hour 10 times, and after the completion of the thermal cycle test, the recording characteristics of each of the optical information recording media were examined.

As a result of the thermal cycle test, it has been found that there is a case where the recording characteristics of the second information recording layer 106 are deteriorated. When the second information recording layer 106 having deteriorated recording characteristics was observed using an optical microscope, the surface of the second information recording layer 106 was damaged by cracking or the like. Such cracking was observed in both the rewritable- and write once-type optical information recording media. The second information recording layer of the rewritable-type optical information recording medium has a six-layered structure, in which a transmittance controlling layer, a reflecting layer, a second dielectric layer, a recording layer, an interface layer, and a first dielectric layer are laminated in this order from the substrate side. The total thickness of these six layers is about 120 nm. On the other hand, the second information recording layer of the write once-type optical information recording medium has a four-layered structure, in which a reflecting layer, a second dielectric layer, a recording layer, and a first dielectric layer are laminated in this order from the substrate side. The total thickness of these four layers is about 50 nm.

Then, various optical information recording media were produced by changing the combination of UV curable resins for forming the first and second intermediate layers 102 and 103 sandwiching the second information recording layer 106, and were then subjected to the thermal cycle test. As a result, it has been found that whether or not such damage as described above is caused depends on the combination of the UV curable resins. The present inventors have further intensively studied by focusing on the physical properties of the intermediate layers 102 and 103, and as a result, have found that whether or not such damage as described above is caused depends on the degree of difference in coefficient of linear expansion between the two intermediate layers 102 and 103.

TABLE 1

|  |  | Temperature | | |
|---|---|---|---|---|
|  |  | 25° C. | 40° C. | 60° C. |
| UV curable resins | A | 0.2 | 0.5 | 0.6 |
|  | B | 1.2 | 2.0 | 1.8 |
|  | C | 0.5 | 7.0 | 2.5 |
|  | D | 1.0 | 3.0 | 2.2 |
|  | E | 1.5 | 3.9 | 0.5 |
|  | F | 1.2 | 2.1 | 2.4 |

$\times 10^{-4}$ (/° C.)

TABLE 2

|  |  | Second intermediate layer | | |
|---|---|---|---|---|
|  |  | D | E | F |
| First intermediate layer | A | x | x | o |
|  | B | o | o | o |
|  | C | x | x | x |

Table 1 shows the measured coefficients of linear expansion of intermediate layers made of different UV curable resins. Table 2 shows the results of thermal cycle test of the second information recording layer 106 in various optical information recording media each produced using different two of the UV curable resins shown in Table 1 for forming the first and second intermediate layers 102 and 103. It is to be noted that in Table 2, the symbol "o" represents that no cracking was observed in the second information recording layer 106 and the symbol "x" represents that cracking was observed in the second information recording layer 106. Also in this case, the results of the thermal cycle test performed on the rewritable-type optical information recording media and the results of the thermal cycle test performed on the write once-type optical information recording media were the same.

As can be seen from Table 2, cracking occurs when the difference in coefficient of linear expansion between the first and second intermediate layers 102 and 103 at a temperature of 25, 40, or 60° C. is $2.5 \times 10^{-4}$ (1/° C.) or more, but does not occur when the difference in coefficient of linear expansion between the first and second intermediate layers 102 and 103 is $1.9 \times 10^{-4}$ (1/° C.) or less. From the results, it can be said that the difference in coefficient of linear expansion between the first and second intermediate layers 102 and 103 is preferably less than $2.5 \times 10^{-4}$ (1/° C.), more preferably $1.9 \times 10^{-4}$ (1/° C.) or less.

Such a phenomenon in which cracking occurs in the surface of the second information recording layer 106 will be discussed in more detail. In general, thermal stress is proportional to coefficient of linear expansion, temperature difference, and elastic modulus. Even if the difference in coefficient of linear expansion between the first and second intermediate layers 102 and 103 is large, stress may not occur, provided that the elastic moduli of the first and second intermediate layers 102 and 103 are virtually 0 MPa. However, if the elastic moduli of the first and second intermediate layers 102 and 103 are too low, these intermediate layers cannot maintain the shape of the groove or pits of the first and second information recording layers so that the recording characteristics of the optical information recording medium are significantly deteriorated. In order to maintain the normal shape of the groove or pits, the elastic moduli of the first and second intermediate layers 102 and 103 are preferably 100 MPa or more at temperatures within the temperature range where optical information recording media are likely to be used, that is, at 60° C. or less. In order to maintain such high elastic moduli of the first and second intermediate layers 102 and 103, the difference in coefficient of linear expansion between the first and second intermediate layers 102 and 103 needs to be kept within the above-described range.

The first embodiment of the present invention has been described above with reference to a three-layer information recording medium, but also in the case of a four or more-layer optical information recording medium, the same phenomenon as described above can occur in an information recording layer sandwiched between two intermediate layers. Therefore, also in the case of a four or more-layer information recording medium, the difference in coefficient of linear expansion between two adjacent intermediate layers sandwiching an information recording layer is preferably within the above-described range.

The present invention has been described above with reference to the first embodiment, but is not limited thereto and can be applied to other embodiments based on the technical idea of the present invention.

Second Embodiment

Herein below, a method for producing an optical information recording medium according to a second embodiment of the present invention will be described with reference to the accompanying drawings. It is to be noted that a description of overlapping points between the first and second embodiments will be omitted.

As described above, according to the first embodiment of the present invention, the first intermediate layer 102 and the second intermediate layer 103 are made of different UV curable resins. On the other hand, according to the method for producing an optical information recording medium of the second embodiment of the present invention, a UV curable resin for forming a first intermediate layer 202 and a UV curable resin for forming a second intermediate layer 203 have substantially the same characteristics in terms of the relationship between total UV dose received and coefficient of linear expansion. Herein below, the second embodiment of the present invention will be described with reference to a case where the first intermediate layer 202 and the second intermediate layer 203 are made of the same UV curable resin, which is an example of a case where a UV curable resin for forming the first intermediate layer 202 and a UV curable resin for forming the second intermediate layer 203 have substantially the same characteristics in terms of the relationship between total UV dose received and coefficient of linear expansion. It is to be noted that the second embodiment of the present invention is not limited to the above-described case, and a UV curable resin for forming the first intermediate layer 202 and a UV curable resin for forming the second intermediate layer 203 may be different from each other as long as they have substantially the same characteristics in terms of the relationship between total UV dose received and coefficient of linear expansion.

In the second embodiment of the present invention, an optical information recording medium having the first and second intermediate layers 202 and 203 made of the same UV curable resin was produced. However, when such an optical information recording medium was subjected to a thermal cycle test between 25° C. and 60° C. in the same manner as in the first embodiment, cracking occurred in a second information recording layer 206.

When the coefficients of linear expansion of the first and second intermediate layers 102 and 103 were measured, it was found that there was a large difference in coefficient of linear expansion at about 40° C. between the first intermediate layer 102 ($0.5 \times 10^{-4}$ ($1/°$ C.)) and the second intermediate layer 103 ($3.1 \times 10^{-4}$ ($1/°$ C.)).

TABLE 3

| | | Temperature | | |
|---|---|---|---|---|
| | | 25° C. | 40° C. | 60° C. |
| UV dose(mj/cm$^2$) | 1500 | 1.6 | 3.1 | 1.8 |
| | 800 | 0.9 | 1.3 | 1.4 |
| | 300 | 0.1 | 0.5 | 0.6 |

$\times 10^{-4}$(° C.)

Table 3 shows the relationship between UV dose and coefficient of linear expansion when a UV curable resin for forming intermediate layers is irradiated with UV light emitted from a UV lamp RC-747 manufactured by Xenon Corporation. From the results shown in Table 3, it can be seen that even when intermediate layers are made of the same UV curable resin, the coefficients of linear expansion of the intermediate layers widely vary depending on UV dose received. Therefore, also in a case where a plurality of intermediate layers are made of the same UV curable resin, all the intermediate layers preferably have the same level of coefficient of linear expansion. Based on the results of both the first and second embodiments, the difference in coefficient of linear expansion between the first and second intermediate layers 202 and 203 is preferably less than $2.5 \times 10^{-4}$ ($1/°$ C.), more preferably $1.9 \times 10^{-4}$ ($1/°$ C.) or less.

However, the first intermediate layer 202, the second information recording layer 206, and the second intermediate layer 203 are formed one by one in such a manner that they are laminated in this order, and therefore when the second intermediate layer 203 is formed by curing a UV curable resin 212 by irradiation with UV light, the first intermediate layer 202 is also irradiated with part of the UV light passed through the second information recording layer 206 at the same time. Such a production method usually used has a problem in that the first intermediate layer 202 is irradiated with a larger amount of UV light as compared to the second intermediate layer 203. In this case, as described above, since the total UV dose received by the first intermediate layer 202 is larger than that received by the second intermediate layer 203, the second intermediate layer 203 has a higher coefficient of linear expansion than the first intermediate layer 202.

In order to solve such a problem, according to the method for producing an optical information recording medium of the second embodiment of the present invention, UV doses during three-times UV irradiation are controlled in consideration of the transmittance of the second information recording layer 206 and the transmittance of the third information recording layer 207 so that the total UV dose received by the first intermediate layer 202 and the total UV dose received by the second intermediate layer 203 become approximately the same.

Herein below, one example of a method for approximately equalizing the total UV dose received by the first intermediate layer 202 and the total UV dose received by the second intermediate layer 203 will be described with reference to a case where a three-layer optical information recording medium is produced by the method according to the second embodiment of the present invention.

Figure 2A:
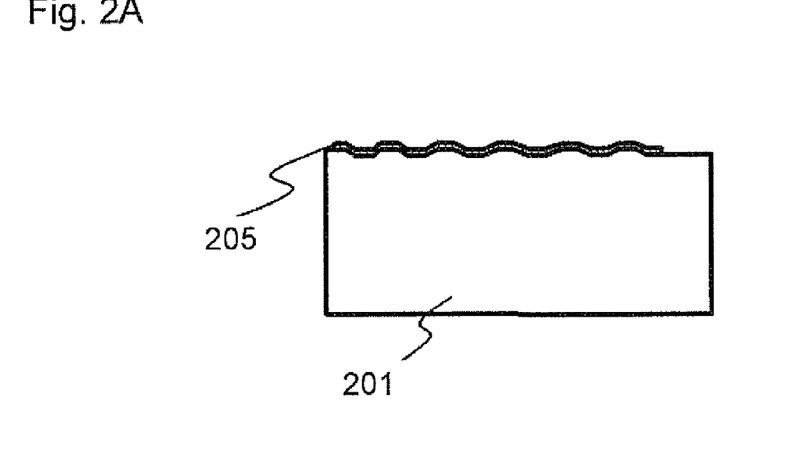
FIGS. 2A and 2B are sectional views illustrating steps of one example method for producing an optical information recording medium according to a second embodiment of the present invention.

(a) First, a substrate 201 having a first information recording layer 205 is prepared. FIG. 2A is a sectional view of the substrate 201 having the first information recording layer 205. The substrate 201 is formed by injection molding using a polycarbonate material to have a center hole with a diameter of about 15 mm, a thickness of about 1.1 mm, and a diameter of about 120 mm. One main surface of the substrate 201 has a groove or pits for the first information recording layer 205. On the main surface of the substrate 201 having the groove or pits, the first information recording layer 205 made of metal is formed by sputtering.

Figure 2B:
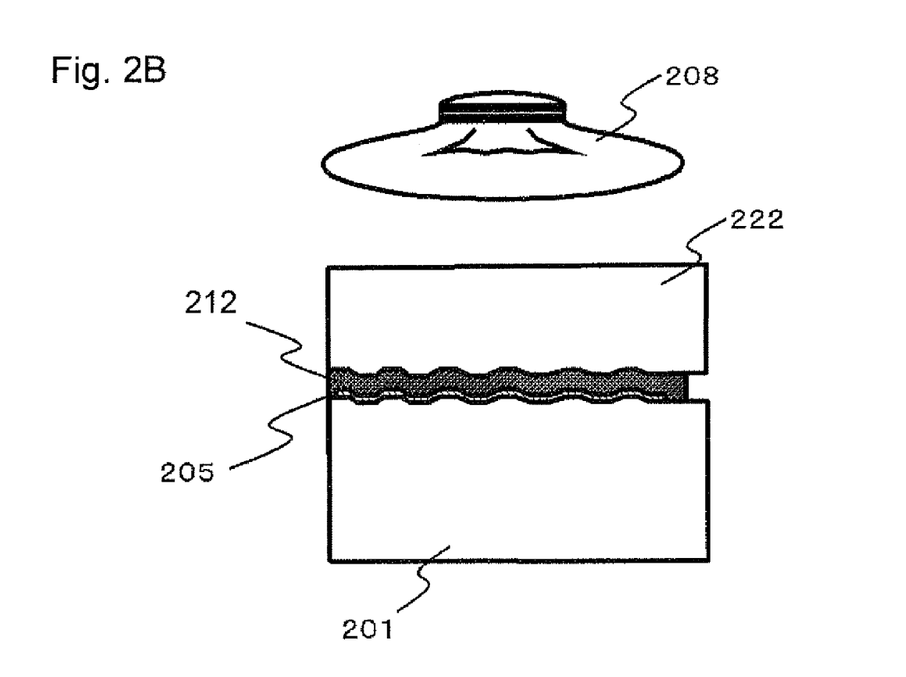

(b) Then, as shown in FIG. 2B, a UV curable resin 212 is applied onto the first information recording layer 205 by spin coating to have a thickness of about 25 μm. It is to be noted that in this case, the UV curable resin 212 is applied by spin coating, but may be applied by other methods.

(c) Then, a first stamper substrate 222 having a groove or pits for recording/reproducing information onto/from a second information recording layer is brought into close contact with the UV curable resin 212 applied onto the first information recording layer 205. Then, the UV curable resin 212 is irradiated with UV light emitted from a UV lamp 208 to cure the UV curable resin 212 to form a first intermediate layer 202. It is to be noted that the surface of the first intermediate layer 202 facing the first stamper substrate 222 has the groove or pits transferred from the stamper 222.

It is to be noted that the UV curable resin 212 is irradiated with UV light emitted from above the first stamper substrate 222, and therefore the first stamper substrate 222 is preferably UV permeable. The first stamper substrate 222 is formed by injection molding using a polycarbonate material. The thickness of the first stamper substrate 222 is about 0.6 mm, but the diameter and center hole diameter of the first stamper substrate 222 are substantially the same as those of the substrate 201.

Figure 3A:
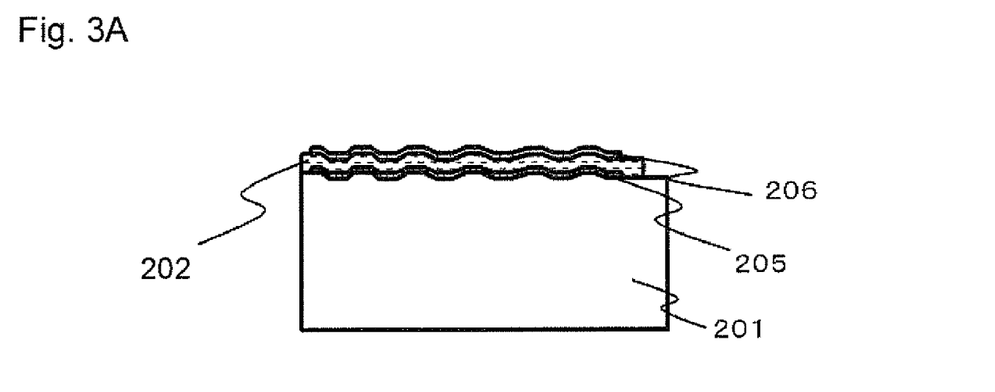
FIGS. 3A and 3B are sectional views illustrating steps of one example method for producing an optical information recording medium according to a second embodiment of the present invention.

(d) Then, as shown in FIG. 3A, the first stamper substrate 222 is separated from the first intermediate layer 202 formed by curing the UV curable resin 212, and then a second information recording layer 206 is formed by sputtering on the surface of the first intermediate layer 202 having the transferred groove or pits.

Figure 3B:
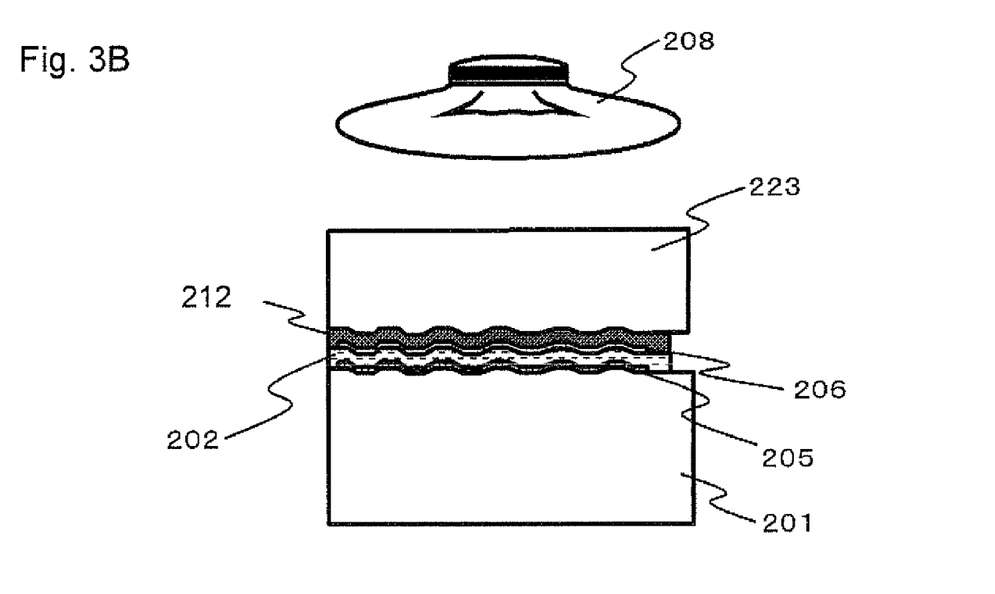

(e) Then, as shown in FIG. 3B, the UV curable resin 212 is applied onto the second information recording layer 206 in the same manner as in the step (b) to have a thickness of about 18 μm. Also in this step, the UV curable resin 212 is applied by spin coating, but may be applied by other methods.

(f) Then, a second stamper substrate 223 having a groove or pits for recording/reproducing information onto/from a third information recording layer is brought into close contact with the UV curable resin 212 applied onto the second information recording layer 206. Then, the UV curable resin 212 is irradiated with UV light emitted from the UV lamp 208 located above the second stamper substrate 223 to form a second intermediate layer 203. Like the first stamper substrate 222, the second stamper substrate 223 is also formed by injection molding using polycarbonate.

Figure 4A:
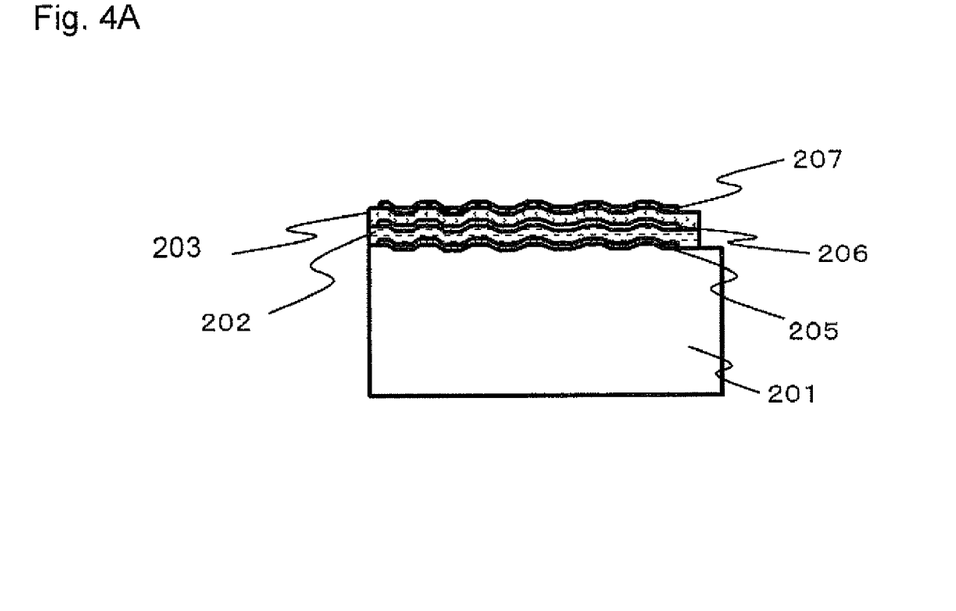
FIGS. 4A and 4B are sectional views illustrating steps of one example method for producing an optical information recording medium according to a second embodiment of the present invention.

(g) Then, as shown in FIG. 4A, the second stamper substrate 223 is separated from the second intermediate layer 203 formed by curing the UV curable resin 212, and then a third information recording layer 207 is formed by sputtering on the second intermediate layer 203.

Figure 4B:
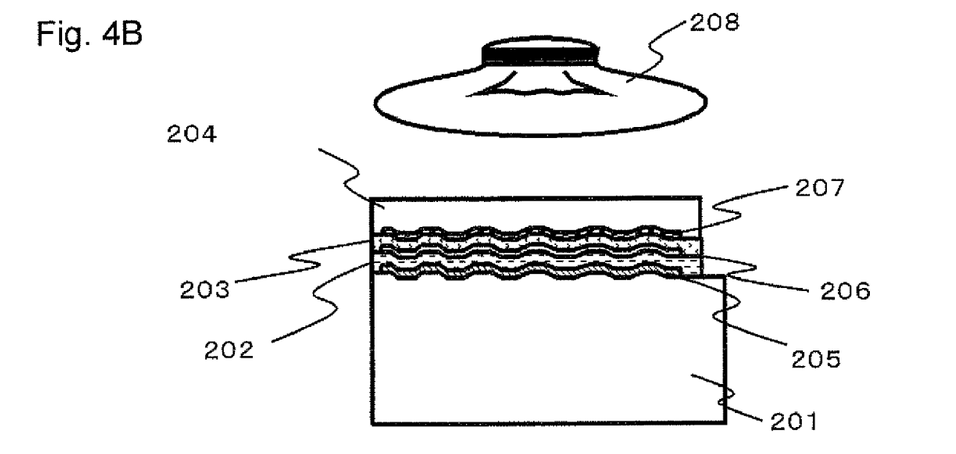

(h) Finally, as shown in FIG. 4B, the UV curable resin 212 is applied onto the third information recording layer 207 to have a thickness of about 57 μm, and then the UV curable resin 212 is irradiated with UV light to cure the UV curable resin 212 to form a light transmitting layer 204. It is to be noted that the UV curable resin 212 is applied by spin coating, more specifically, by a method described in, for example, Japanese Patent No. 3955867 or Japanese Patent Laid-open Publication No. 2005-210950.

According to the method for producing an optical information recording medium of the second embodiment of the present invention, UV doses $UV_1$, $UV_2$, and $UV_3$ are controlled so that the total UV dose $P_1$ received by the first intermediate layer 202 and the total UV dose $P_2$ received by the second intermediate layer 203 become approximately equal to each other or, even if the total UV dose $P_1$ and the total UV dose $P_2$ are slightly different, the difference in coefficient of linear expansion between the first intermediate layer 202 and the second intermediate layer 203 falls within the above-described range (i.e., less than $2.5 \times 10^{-4}$ (1/° C.)).

This makes it possible to adjust the difference in coefficient of linear expansion between the first intermediate layer 202 and the second intermediate layer 203 to a value within the above-described range, thereby preventing the second information recording layer 206 sandwiched between the first and second intermediate layers 202 and 203 from being damaged by, for example, cracking.

In the case of this production method, UV irradiation is performed three times using UV light emitted from above the substrate 201. In this case, it is necessary to determine the total UV dose received by the first intermediate layer 202 and the total UV dose received by the second intermediate layer 203. First, the amount of reflected UV light from each of the information recording layers is very small and is therefore negligible. Further, the UV curable resin for forming the first and second intermediate layers 202 and 203 is irradiated with UV light passed through the first stamper substrate 222 or the second stamper substrate 223, and therefore, in fact, it is necessary to take the UV transmittance of the stamper substrate 222 and the UV transmittance of the stamper substrate 223 into consideration. However, in order to simplify consideration, the amount of UV light passed through the stamper substrate 222 and the amount of UV light passed through the stamper substrate 223 are used for determining the total UV dose received by the first intermediate layer 202 and the total UV dose received by the second intermediate layer 203. Namely, the amount of UV light passed through the first stamper substrate 222 when first-time UV irradiation is performed on the UV curable resin 212 is defined as a UV dose $UV_1$, the amount of UV light passed through the second stamper substrate 223 when second-time UV irradiation is performed on the UV curable resin 212 is defined as a UV dose $UV_2$, and the amount of UV light when third-time UV irradiation is performed on the UV curable resin 212 is defined as a UV dose $UV_3$. That is, the transmittance of the second information recording layer 206 is defined as $t_2$, and the transmittance of the third information recording layer 207 is defined as $t_3$.

Based on the above-described conditions, the total UV dose $P_1$ received by the first intermediate layer 202 and the total UV dose $P_2$ received by the second intermediate layer 203 are calculated in consideration of the UV transmittance of the second information recording layer 206 and the UV transmittance of the third information recording layer 207. The total UV dose $P_1$ received by the first intermediate layer 202 can be calculated by the following formula:

$$P_1 = UV_1 + UV_2 \cdot t_2 + UV_3 \cdot t_2 \cdot t_3.$$

On the other hand, the total UV dose $P_2$ received by the second intermediate layer 203 can be calculated by the following formula:

$$P_2 = UV_2 + UV_3 \cdot t_3.$$

The condition that the total UV dose $P_1$ received by the first intermediate layer 202 and the total UV dose $P_2$ received by the second intermediate layer 203 are approximately equal to each other can be represented by the following formula:

$$P_1 \cong P_2.$$

Further, the formula $P_1 \cong P_2$ can be represented using $UV_1$, $UV_2$, $UV_3$, $t_2$, and $t_3$ as follows:

$$UV_1 + UV_2 \cdot t_2 + UV_3 \cdot t_2 \cdot t_3 = UV_2 + UV_3 \cdot t_3$$

$$UV_1 = (1 - t_2)(UV_2 + UV_3 \cdot t_3).$$

Figure 5:
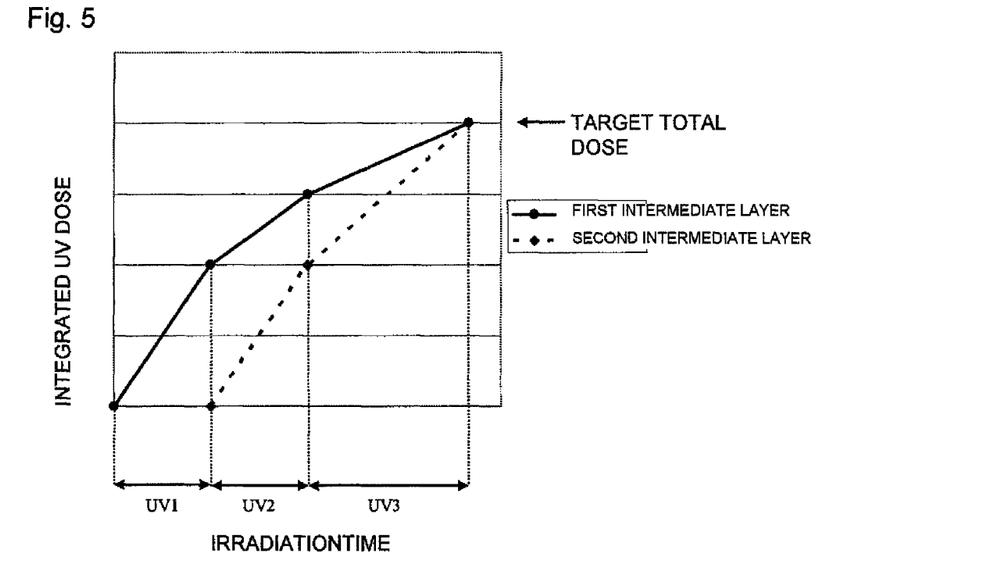
FIG. 5 is a graph showing the relationship between UV doses $UV_1$, $UV_2$, and $UV_3$ during three-times UV irradiation and the total UV doses $P_1$ and $P_2$ received by a first intermediate layer and a second intermediate layer, respectively when an optical information recording medium having three information recording layers is produced by a method for producing an optical information recording medium according to the second embodiment of the present invention.

FIG. 5 is a graph showing the relationship between UV doses $UV_1$, $UV_2$, and $UV_3$ during three-times UV irradiation and the total UV doses $P_1$ and $P_2$ received by the first intermediate layer 202 and the second intermediate layer 203, respectively when an optical information recording medium having three information recording layers is produced by the method for producing an optical information recording medium according to the second embodiment of the present invention. As shown in FIG. 5, during second-time UV irradiation for forming the second intermediate layer 203 located above the first intermediate layer 202, the first intermediate layer 202 located below the second intermediate layer 203 is also irradiated with UV light passed through the second information recording layer 206. In this case, the slope of increase in UV dose received by the first intermediate layer 202 is gentler than the slope of increase in UV dose received by the second intermediate layer 203 because UV light received by the second intermediate layer 203 passes through the second information recording layer 206 to the first intermediate layer 202. Further, during third-time UV irradiation for forming the light transmitting layer 204, the first intermediate layer 202 receives UV light passed through the third information recording layer 207 and the second information recording layer 206, and the second intermediate layer 203 receives UV light passed through the third information recording layer 207. However, according to the method for producing an optical information recording medium of the second embodiment of the present invention, as shown in FIG. 5, it is possible to approximately equalize the total UV dose received by the first intermediate layer 202 and the total UV dose received by the second intermediate layer 203 by controlling UV doses $UV_1$, $UV_2$, and $UV_3$ during three-times UV irradiation in consideration of the transmittance of the second information recording layer 206 and the transmittance of the third information recording layer 207.

MODIFIED EXAMPLE

The second embodiment of the present invention has been described above with reference to an optical information recording medium having three information recording layers. Herein below, a modified example of the second embodiment of the present invention will be further described with reference to an optical information recoding medium having four information recording layers. In this case, UV irradiation is performed four times, and a UV dose during first-time UV irradiation for forming a first intermediate layer is defined as $UV_1$, a UV dose during second-time UV irradiation for forming a second intermediate layer is defined as $UV_2$, a UV dose during third-time UV irradiation for forming a third intermediate layer is defined as $UV_3$, and a UV dose during fourth-time UV irradiation for forming a light transmitting layer is defined as $UV_4$.

The total UV dose $P_1$ received by the first intermediate layer, the total UV dose $P_2$ received by the second intermediate layer, and the total UV dose $P_3$ received by the third intermediate layer can be represented by the following formulas, respectively:

$$P_1 = UV_1 + UV_2 \cdot t_2 + UV_3 \cdot t_2 \cdot t_3 + UV_4 \cdot t_2 \cdot t_3 \cdot t_4$$

$$P_2 = UV_2 + UV_3 \cdot t_3 + UV_4 \cdot t_3 \cdot t_4$$

$$P_3 = UV_3 + UV_4 \cdot t_4$$

Further, the condition that the total UV doses $P_1$ to $P_3$ are approximately equal to one another can be represented by the following formula: $P_1 \cong P_2 \cong P_3 \cong P_4$.

Figure 6:
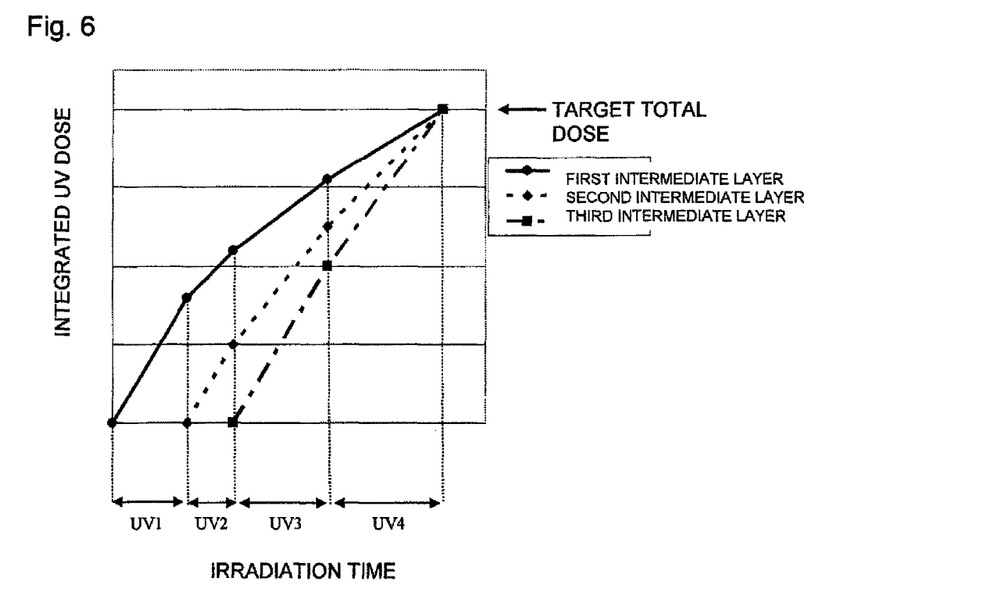
FIG. 6 is a graph showing the relationship between UV doses $UV_1$, $UV_2$, $UV_3$, and $UV_4$ during four-times UV irradiation and the total UV doses $P_1$, $P_2$, and $P_3$ received by a first intermediate layer, a second intermediate layer, and a third intermediate layer, respectively when an optical information recording medium having four information recording layers is produced by a method for producing an optical information recording medium according to a modified example of the second embodiment of the present invention.

FIG. 6 is a graph showing the relationship between UV doses $UV_1$, $UV_2$, $UV_3$, and $UV_4$ during four-times UV irradiation and the total UV doses $P_1$, $P_2$, and $P_3$ received by the first intermediate layer, the second intermediate layer, and the third intermediate layer, respectively when an optical information recording medium having four information recording layers is produced by a method for producing an optical information recording medium according to the modified example of the second embodiment of the present invention. As shown in FIG. 6, during second-time UV irradiation for forming the second intermediate layer located above the first intermediate layer, the first intermediate layer located below the second intermediate layer is also irradiated with UV light passed through the second information recording layer. In this case, the slope of increase in UV dose received by the first intermediate layer is gentler than the slope of increase in UV dose received by the second intermediate layer because UV light received by the second intermediate layer passes through the second information recording layer to the first intermediate layer. Further, during third-time UV irradiation for forming the third intermediate layer located above the second intermediate layer, the second intermediate layer located below the third intermediate layer is also irradiated with UV light passed through the third information recording layer, and the first intermediate layer located below the second intermediate layer is also irradiated with UV light passed through the third information recording layer and the second information recording layer. Further, during fourth-time UV irradiation for forming the light transmitting layer, the first intermediate layer receives UV light passed through the fourth, third, and second information recording layers, the second intermediate layer receives UV light passed through the fourth and third information recording layers, and the third intermediate layer receives UV light passed through the fourth information recording layer. However, according to the method for producing an optical information recording medium of the modified example of the second embodiment of the present invention, as shown in FIG. 6, it is possible to approximately equalize the total UV dose received by the first intermediate layer, the total UV dose received by the second intermediate layer, and the total UV dose received by the third intermediate layer by controlling UV doses $UV_1$, $UV_2$, $UV_3$, and $UV_4$ during four-times UV irradiation in consideration of the transmittance of the second information recording layer, the transmittance of the third information recording layer, and the transmittance of the fourth information recording layer.

It is to be noted that an optical information recording medium having n information recording layers has n−1 intermediate layers and one light transmitting layer. In this case, the total UV dose $P_s$ received by the s-th intermediate layer can be represented by the following formula:

$$P_S = UV_S + \sum_{i=S+1}^{n} UV_i \left( \prod_{j=S+1}^{i} t_j \right)$$

wherein n is a natural number of 3 or more, s is a natural number varying from 1 to n−1, i and j are each a natural number of 1 or more, and $t_i$ represents the transmittance of the i-th information recording layer.

Further, the condition that the total UV doses $P_s$ received by each of the intermediate layers are approximately the same can be represented by the following formula: $P_1 \cong P_2 \cong P_3 \cong \ldots \cong P_{n-1}$ The method for producing an optical information recording medium according to the second embodiment of the present invention has been described above with reference to some examples to explain how to approximately equalize the total UV doses received by each of the intermediate layers made of the same UV curable resin. Further, also in a case where, for example, a protective layer made of a UV curable resin is provided on the surface of the light transmitting layer for the purpose of preventing scratches, it is preferred that the total UV doses received by each of the intermediate layers are calculated in the same manner as described above to control a UV dose every time UV irradiation is performed so that the total UV doses received by each of the intermediate layers become approximately the same. This makes it possible to adjust the difference in coefficient of linear expansion between the intermediate layers to a value within the above-described preferred range.

Further, the same applies to a case where an optical information recording medium is produced by a different UV irradiation process (e.g., a case where UV light is emitted from below the substrate or a case where UV light is emitted from both above and below the substrate) and a case where an optical information recording medium having five or more information recording layers is produced.

The second embodiment of the present invention has been described above with reference to some examples, but the present invention is not limited thereto and can be applied to other embodiments based on the technical idea of the present invention.

Third Embodiment

The first and second embodiments of the present invention have been described with reference to an optical information recording medium having a Blu-ray disc structure. However, a phenomenon in which an optical information recording layer sandwiched between two intermediate layers is damaged during temperature rise due to the difference in coefficient of linear expansion between the two intermediate layers can occur also in, for example, multilayer HD-DVDs and other next-generation recording media irrespective of the entire disc structure. Therefore, as described above with reference to the first and second embodiments, the difference in coefficient of linear expansion between intermediate layers is preferably small.

The optical information recording medium and the method for producing an optical information recording medium according to the present invention are useful to provide a multilayer optical information recording medium having high reliability.

The invention claimed is:

1. A manufacturing method for an optical information recording medium having three information recording layers, two intermediate layers, and one light transmitting layer, the method comprising:
   providing a first UV curable resin on a first information recording layer;
   forming a first intermediate layer by curing the first UV curable resin by performing first-time UV irradiation to irradiate the first UV curable resin with UV light emitted from above the first UV curable resin at a first dose;
   providing a second information recording layer on the first intermediate layer;
   providing a second UV curable resin on the second information recording layer;
   forming a second intermediate layer by curing the second UV curable resin by performing second-time UV irradiation to irradiate the second UV curable resin with UV light emitted from above the second UV curable resin at a second dose;
   providing a third information recording layer on the second intermediate layer;
   providing a third UV curable resin on the third information recording layer; and
   forming a light transmitting layer by curing the third UV curable resin by performing third-time UV irradiation to irradiate the third UV curable resin with UV light emitted from above the third UV curable resin at a third dose,
   wherein the first UV curable resin and the second UV curable resin have substantially the same characteristics in terms of the relationship between total UV dose received and coefficient of linear expansion, and
   wherein the first dose during the first-time UV irradiation, the second dose during the second-time UV irradiation, and the third dose during the third-time UV irradiation are controlled so that a total UV dose received by the first intermediate layer and a total UV dose received by the second intermediate layer become substantially the same.

2. The manufacturing method for an optical information recording medium according to claim 1, wherein when a transmittance of the second information recording layer is defined as $t_2$, a transmittance of the third information recording layer is defined as $t_3$, the first dose during the first-time UV irradiation is defined as $UV_1$, the second dose during the second-time UV irradiation is defined as $UV_2$, the third dose during the third-time UV irradiation is defined as $UV_3$, the total UV dose received by the first intermediate layer is defined as $P_1$, and the total UV dose received by the second intermediate layer is defined as $P_2$, the total UV dose $P_1$ is represented by the following formula:

$$P_1 = UV_1 + UV_2 \cdot t_2 + UV_3 \cdot t_2 \cdot t_3,$$

and the total UV dose $P_2$ is represented by the following formula:

$$P_2 = UV_2 + UV_3 \cdot t_3,$$

and wherein the first dose $UV_1$ during the first-time UV irradiation, the second dose $UV_2$ during the second-time UV irradiation, and the third dose $UV_3$ during the third-time UV irradiation are controlled so that the total UV dose $P_1$ received by the first intermediate layer and the total UV dose $P_2$ received by the second intermediate layer become substantially the same.

3. The manufacturing method for an optical information recording medium according to claim 1, wherein the first UV curable resin and the second UV curable resin are the same.

4. The manufacturing method for an optical information recording medium according to claim 1, wherein at the step of forming the first intermediate layer, the first UV curable resin and a first stamper having a groove or pits for the second information recording layer are opposed to and brought into close contact with each other and then the first UV curable resin is irradiated with UV light emitted from above the first UV curable resin and passed through the first stamper to cure the first UV curable resin to form the first intermediate layer, and wherein at the step of forming the second intermediate layer, the second UV curable resin and a second stamper having a groove or pits for the third information recording layer are opposed to and brought into close contact with each other and then the second UV curable resin is irradiated with UV light emitted from above the second UV curable resin and passed through the second stamper to cure the second UV curable resin to form the second intermediate layer.

5. A manufacturing method for an optical information recording medium having n information recording layers (n is a natural number of 3 or more), n−1 intermediate layers, and one light transmitting layer, the method comprising:

(1) repeating the following steps a) to c) until a natural number i changes from 1 to n−1:
a) providing an i-th UV curable resin on an i-th information recording layer;
b) forming an i-th intermediate layer by curing the i-th UV curable resin by performing i-th UV irradiation to irradiate the i-th UV curable resin with UV light emitted from above the i-th UV curable resin at an i-th dose $UV_i$; and
c) providing an (i+1)-th information recording layer on the i-th intermediate layer;

(2) providing an n-th UV curable resin on the n-th information recording layer; and (3) forming a light transmitting layer by curing the n-th UV curable resin by performing n-th UV irradiation to irradiate the n-th UV curable resin with UV light emitted from above the n-th UV curable resin at an n-th dose $UV_n$, wherein the i-th UV curable resins (i is a natural number varying from 1 to n−1) have substantially the same characteristics in terms of the relationship between total UV dose received and coefficient of linear expansion and total UV doses $P_s$ received by each of s-th intermediate layers represented by the following formula are substantially the same:

$$P_S = UV_S + \sum_{i=S+1}^{n} UV_i \left( \prod_{j=S+1}^{i} t_j \right)$$

wherein n is a natural number of 3 or more, s is a natural number varying from 1 to n−1, i and j are each a natural number of 2 or more, and $t_i$ represents a transmittance of the i-th information recording layer.

6. The manufacturing method for an optical information recording layer according to claim 5, wherein at the step of forming the i-th intermediate layer, the i-th UV curable resin and an i-th stamper having a groove or pits for the (i+1)-th information recording layer are opposed to and brought into close contact with each other and then the i-th UV curable resin is irradiated with UV light emitted from above the i-th UV curable resin and passed through the i-th stamper to cure the i-th UV curable resin to form the i-th intermediate layer.

7. A manufacturing method for an optical information recording medium having three information recording layers, two intermediate layers, and one light transmitting layer, the method comprising:

providing a first UV curable resin on a first information recording layer;

forming a first intermediate layer by curing the first UV curable resin by performing first-time UV irradiation to irradiate the first UV curable resin with UV light emitted from above the first UV curable resin at a first dose;

providing a second information recording layer on the first intermediate layer;

providing a second UV curable resin on the second information recording layer;

forming a second intermediate layer by curing the second UV curable resin by performing second-time UV irradiation to irradiate the second UV curable resin with UV light emitted from above the second UV curable resin at a second dose;

providing a third information recording layer on the second intermediate layer;

providing a third UV curable resin on the third information recording layer; and forming a light transmitting layer by curing the third UV curable resin by performing third-time UV irradiation to irradiate the third UV curable resin with UV light emitted from above the third UV curable resin at a third dose, wherein the first UV curable resin and the second UV curable resin are different from each other, and wherein the first dose during the first-time UV irradiation, the second dose during the second-time UV irradiation, and the third dose during the third-time UV irradiation are controlled so that a difference in coefficient of linear expansion between the first intermediate layer subjected to the first-time, second-time, and third-time UV irradiation and the second intermediate layer subjected to the second-time and third-time UV irradiation becomes less than $2.5 \times 10^{-4}$ (1/° C.).

8. The manufacturing method for an optical information recording medium according to claim 7, wherein at the step of forming the first intermediate layer, the first UV curable resin and a first stamper having a groove or pits for the second information recording layer are opposed to and brought into close contact with each other and then the first UV curable resin is irradiated with UV light emitted from above the first UV curable resin and passed through the first stamper to cure the first UV curable resin to form the first intermediate layer, and at the step of forming the second intermediate layer, the second UV curable resin and a second stamper having a groove or pits for the third information recording layer are opposed to and brought into contact with each other and then the second UV curable resin is irradiated with UV light emitted from above the second UV curable resin and passed through the second stamper to cure the second UV curable resin to form the second intermediate layer.

9. An optical information recording medium with three or more information recording layers produced by the method for producing an optical information recording medium according to claim 1, the optical information recording medium comprising:

two intermediate layers between which one of the three or more information recording layers is sandwiched, wherein a difference in coefficient of linear expansion between the two adjacent intermediate layers sandwiching the one of the information recording layers is less than $2.5\times10^{-4}$ (1/° C.).

10. The optical information recording medium according to claim 9, wherein the difference in coefficient of linear expansion between the two adjacent intermediate layers sandwiching the one of the three or more information recording layers is less than $1.9\times10^{-4}$ (1/° C.).

11. The optical information recording medium according to claim 9, wherein each of the two adjacent intermediate layers sandwiching the one of the information recording layers has a tensile elastic modulus of 100 MPa or more at a temperature of 60° C. or less.

* * * * *